US010108934B2

(12) United States Patent
Basu et al.

(10) Patent No.: US 10,108,934 B2
(45) Date of Patent: Oct. 23, 2018

(54) ITEMS SELECTION VIA AUTOMATIC GENERALIZATION

(75) Inventors: Sumit Basu, Seattle, WA (US); Alan L. Ritter, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1367 days.

(21) Appl. No.: 12/474,025

(22) Filed: Jul. 10, 2009

(65) Prior Publication Data
US 2011/0010669 A1 Jan. 13, 2011

(51) Int. Cl.
G06Q 10/10 (2012.01)
G06F 9/451 (2018.01)

(52) U.S. Cl.
CPC ........... *G06Q 10/107* (2013.01); *G06F 9/453* (2018.02); *G06Q 10/10* (2013.01)

(58) Field of Classification Search
CPC ....... G06Q 10/10; G06Q 10/107; G06Q 9/453
USPC ....... 715/701, 734, 740, 760, 762, 704, 745, 715/789, 811
See application file for complete search history.

(56) References Cited

U.S. PATENT DOCUMENTS

| 6,323,884 | B1 | 11/2001 | Bird et al. |
| 6,453,307 | B1 | 9/2002 | Schapire et al. |
| 6,535,229 | B1 * | 3/2003 | Kraft ............................. 715/764 |
| 8,032,506 | B1 * | 10/2011 | Gregov et al. ............... 707/706 |
| 8,037,425 | B2 * | 10/2011 | Lection ............. G06F 17/30017 707/705 |
| 8,359,279 | B2 * | 1/2013 | Fisher et al. ..................... 706/11 |
| 2004/0095390 | A1 | 5/2004 | Arning et al. |
| 2005/0234955 | A1 | 10/2005 | Zeng et al. |
| 2005/0246643 | A1 | 11/2005 | Gusmorino et al. |
| 2006/0032363 | A1 * | 2/2006 | Platt .................. G06F 17/30038 84/601 |
| 2006/0074928 | A1 | 4/2006 | MacLaurin et al. |
| 2006/0112098 | A1 * | 5/2006 | Renshaw et al. ................. 707/7 |

(Continued)

OTHER PUBLICATIONS

Kim, Kyoung-jae, and Hyunchul Ahn. "A recommender system using GA K-means clustering in an online shopping market." Expert systems with applications 34.2 (2008): 1200-1209.*

(Continued)

*Primary Examiner* — William L Bashore
*Assistant Examiner* — Daniel W Parcher
(74) *Attorney, Agent, or Firm* — Alleman Hall Creasman & Tuttle LLP

(57) ABSTRACT

A method and system, are provided herein, for automatic selection of one or more items (e.g., files, emails, etc.) in a user interface, based upon selection data received from a user (hard labels) and possibly also predicted (soft) labels (e.g., from a label prediction algorithm) based on behavior data associated with the selections. More particularly, a user selects and deselects items as positive and negative examples that are used as explicit labels to form an item selection list. The explicit labels are used possibly along with additional, predicted labels to create a list of generated items the user may want to select. This list is returned to the user interface as automatically selected items. In one example, the selection list may be iteratively updated upon receiving subsequent user selection data (e.g., user may select items incorrectly selected) by determining alternative items that the user may be interested in selecting.

19 Claims, 11 Drawing Sheets

(56) References Cited

U.S. PATENT DOCUMENTS

| | | | |
|---|---|---|---|
| 2006/0112346 A1* | 5/2006 | Miksovsky | G06F 3/0481 715/764 |
| 2006/0195462 A1* | 8/2006 | Rogers | G06F 17/30766 |
| 2006/0230334 A1* | 10/2006 | Slawson et al. | 715/500.1 |
| 2006/0248054 A1* | 11/2006 | Kirshenbaum | G06F 17/30705 |
| 2007/0078849 A1* | 4/2007 | Slothouber | G06Q 30/02 |
| 2008/0163133 A1* | 7/2008 | Martinez et al. | 715/864 |
| 2008/0250312 A1* | 10/2008 | Curtis | 715/700 |
| 2009/0157571 A1* | 6/2009 | Smith et al. | 706/12 |
| 2010/0011388 A1* | 1/2010 | Bull | H04N 21/41407 725/9 |
| 2010/0070917 A1* | 3/2010 | Gates | G06F 17/30053 715/810 |
| 2010/0241994 A1* | 9/2010 | Wiley et al. | 715/832 |
| 2010/0332440 A1* | 12/2010 | Brodsky | 706/52 |
| 2011/0167386 A1* | 7/2011 | De Wit | 715/825 |
| 2013/0125002 A1* | 5/2013 | Spaeth et al. | 715/731 |

OTHER PUBLICATIONS

Kelleher, Jerome, and Derek Bridge. "An accurate and scalable collaborative recommender." Artificial Intelligence Review 21.3-4 (2004): 193-213.*

Andric, Andreja, and Goffredo Haus. "Automatic playlist generation based on tracking user's listening habits." Multimedia Tools and Applications 29.2 (2006): 127-151.*

Hijikata, Yoshinori, Kazuhiro Iwahama, and Shogo Nishida. "Content-based music filtering system with editable user profile." Proceedings of the 2006 ACM symposium on Applied computing. ACM, 2006.*

Breese, John S., David Heckerman, and Carl Kadie. "Empirical analysis of predictive algorithms for collaborative filtering." Proceedings of the Fourteenth conference on Uncertainty in artificial intelligence. Morgan Kaufmann Publishers Inc., 1998.*

Ritter, Alan, and Sumit Basu."Learning to generalize for complex selection tasks." Proceedings of the 14th international conference on Intelligent user interfaces. ACM, 2009.*

Pauws, Steffen, and Berry Eggen. "PATS: Realization and user evaluation of an automatic playlist generator." ISMIR. 2002.*

Platt, John C., et al. "Learning a Gaussian Process Prior for Automatically Generating Music Playlists." NIPS. 2001.*

Thrun, Sebastian. "Is learning the n-th thing any easier than learning the first?." Advances in neural information processing systems (1996): 640-646.*

Freund, Yoav, and Robert E. Schapire. "A desicion-theoretic generalization of on-line learning and an application to boosting." Computational learning theory. Springer Berlin Heidelberg, 1995.*

"Smart Selection", http://designinginterfaces.com/Smart_Selection.

Miller et al., "LAPIS: Smart Editing with Text Structure", School of Computer Science Carnegie Mellon University, File translated from TEX by TTH, version 2 58. On Dec. 6, 2001, http://www.cs.cmu.edu/~rcm/papers/chi02/chi02.html.

Bao, et al., "Fewer Clicks and Less Frustration: Reducing the Cost of Reaching the Right Folder", 2006, http://eecs.oregonstate.edu/TaskTracer/papers/iui06Bao.pdf.

Blum et al., "Combining Labeled and Unlabeled Data With Co-Training", This paper is to appear in the Proceedings of the 1998 Conference on Computational Learning Theory, http://research.nii.ac.jp/~collier/etc/MLgroup/Pool/colt98_final.pdf.

Cypher, Allen, "Eager: Programming Repetitive Tasks by Demonstration", pp. 1-13, http://acypher.com/wwid/Chaptrs/09Eager.html.

Fails et al., "Interactive Machine Learning", Computer Science Department Brigham Young University, http://www.cc.gatech.edu/~isbell/classes/2006/cs8803API_spring/InteractiveMachineLearning.pdf.

Fogarty et al., "CueFlik: Interactive Concept Learning in Image Search", Apr. 5-10, 2008, Florence, Italy, http://www.cs.washington.edu/homes/jfogarty/publications/chi2008-cueflik.pdf.

Freund et al., "A Decision—Theoretic Generalization of On-Line Learning and an Application to Boosting", Journal of Computer and System Sciences 55, 119-139 (1997), Article No. SS971504, http://www.face-rec.org/algorithms/Boosting-Ensemble/decision-theoretic_generalization.pdf.

Kristjansson et al., "Interactive Information Extraction with Constrained Conditional Random Fields", 2004, American Association for Artificial Intelligence (www.aaai.org), http://www.cs.umass.edu/~culotta/pubs/kristjannson04interactive.pdf.

Maynes-Aminzad et al., "Eyepatch: Prototyping Camera-Based Interaction through Examples", UIST'07, Oct. 7-10, 2007, Newport, Rhode Island, USA, http://hci.stanford.edu/publications/2007/eyepatch-uist07.pdf.

Miller et al., "Multiple Selections in Smart Text Editing", Jan. 13-16, 2002, San Francisco, California, USA, http.//citeseerx.ist.psu.edu/viewdoc/summary?doi=10.1.1.25.927.

Platt et al., "Learning a Gaussian Process Prior for Automatically Generating Music Playlists", http://books.nips.cc/papers/files/nips14/AP03.pdf.

Thrun, Sebastian, "Is Learning the n-th Thing Any Easier Than Learning the First?" https://sprints.kfupm.edu.sa/47075/1/47075.pdf.

* cited by examiner

ITEMS SELECTION VIA AUTOMATIC GENERALIZATION

BACKGROUND

Computers have become an integral part of our daily lives. Many people rely upon computers to store data for work, to store personal media, to communicate with one another, etc. All of these actions use a computer to store data as items (e.g., emails, files, cells within a spreadsheet, etc.) that are accessible by both the computer and a user. Over time, the number of items that a computer may store can grow to including hundreds or thousands of items that a user may interact with. For example, computers may store a large number of media files or emails that a user may need to access or manipulate (e.g., delete or transfer). To aid in the selection of a large number of files many computers offer organizational options which allow a user to more easily group items.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, a method and system for automated assisted item (e.g., file, email, etc.) selection is provided herein. More particularly, a method and system are provided herein to generate an item selection set, comprising automatically generalized items that a user may want to select, based upon positive (e.g., selections) and negative (e.g., de-selections) exemplary actions taken by the user.

In one particular example, a method and system provided herein aid users in performing complex selection tasks by providing for automatic selection of one or more items (e.g., files, emails, etc.), based upon selection data received from a user (hard labels) and predicted labels based on behavior data associated with the selection data (soft labels). More particularly, a user selects and deselects items as positive and negative examples which are used as labels for training a classifier using one or more machine learning algorithms. The system utilizes data from the user's selections to form an item selection set, comprising generated selection items a user may want to select, which may be iteratively updated upon receiving additional selection data to determine alternative items that the user may be interested in selecting. For example, a user may initially select one or more files which the system utilizes to determine an item selection set that is returned to a user (e.g., the system may automatically select additional items in a user's GUI interface in response to the user's initial selection). The user may then select more items or deselect incorrectly selected items, thereby providing the system with more information about what the user wants, and from which the system can reconfigure its selection. Therefore, based upon a plurality of user selections, the system will determine other similar items that are to be automatically selected. This allows the system to reach its target selection after being provided by a user with a small number of examples. Once selected, a user may make use of these generated selections as they would with items they had selected on their own, for example by deleting, moving, etc. This aids users in selection of items, thereby allowing users to perform tasks on a computer with greater efficiency.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
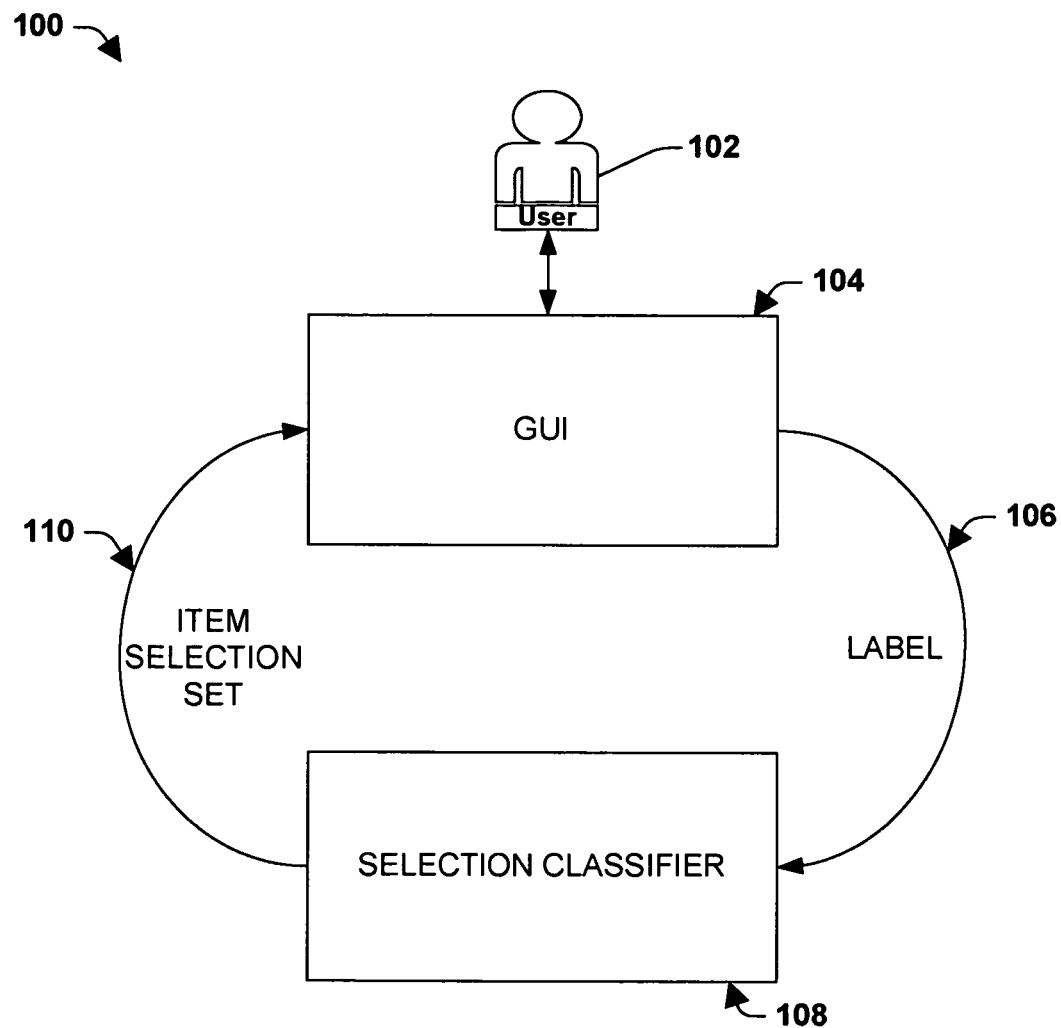
FIG. 1 illustrates a workflow diagram of an automatic generalization selection process provided herein.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

A variety of common tasks entail users selecting multiple items from a list, for example: picking out multiple files to delete or copy in a file browser, selecting emails to be moved to a folder, or selecting particular cells, rows, or columns from a spreadsheet. If there are a small number of items, this can be a fairly easy task, but when there are many items, the task may become more complex. For example, if a user wants all files that contain "old" in the title, she generally has little recourse but to individually select respective files, a potentially time consuming and costly undertaking. In the case of file selection in particular, there may the option of resorting to the command line or a search interface. From there, a user may use regular expressions or complex search syntax to specify an arbitrary list, however this level of complexity is well beyond the reach and/or patience of many typical users.

Among other things, a method and system to aid users in performing complex selection tasks through an automatic generalization selection process is provided herein. The method and system provide for automatic selection of one or more items (e.g., files, emails, etc.), based upon selection data received from a user (hard labels) and predicted labels based on behavior data associated with the selections (soft labels). More particularly, a user selects and deselects items as positive and negative examples which are used as labels for training a classifier using some machine learning algorithm. The system utilizes data from the user's selections to form an item selection set, comprising generated selection items a user may want to select, which may be iteratively updated upon receiving additional selection data to determine alternative items that the user may be interested in selecting. For example, a user may initially select one or more files which the system utilizes to determine an item selection set that is returned to a user (e.g., the system may automatically select additional items in a user's GUI interface in response to the user's initial selection). The user may then select more items or deselect incorrectly selected items, thereby providing the system with more information about what the user wants, and from which the system can reconfigure its selection. Therefore, based upon a plurality of user selections, the system will determine other similar items that are to be automatically selected. This allows the system to reach its target selection after being provided by a user with a small number of examples. Once selected, a user may make use of these generated selections as they would with items they had selected on their own, for example by deleting, moving, etc. This aids users in selection of items, thereby allowing users to perform tasks on a computer with greater efficiency.

It will be appreciated that although the method and system provided herein may be described in relation to the selection of files or email, the concept may extend to the selection of any item. In one example, the selection of items may comprise the selection of music items within a music list, a spreadsheet item (e.g., spreadsheet cell) within a spreadsheet, a database table entry item within a database table, an image item within an image list, a product item within a product list, or more generally a faceted item in a list of faceted items. In another example, the selection may include items not in a list such as objects in drawing software, "command groups" in real time strategy games, etc. That is, the disclosure herein is not meant to be limited to/by the particular examples illustrated.

FIG. 1 illustrates a workflow diagram 100 of the automatic generalization selection process provided herein. The process begins with a user 102 making an item selection (e.g., a positive selection) in a graphical user interface (GUI) 104. The item selection may be relayed, as a label 106, to a selection classifier 108. The selection classifier 108 is configured to determine an item selection set comprising discrete items, based upon a generalized pattern formed from a user's selection. The selection classifier returns the item selection set 110 to the GUI 104, which automatically selects additional items in the GUI 104.

The process iteratively proceeds, based upon additional user selections (e.g., positive or negative selection feedback data), to determine an improved generalized item selection set 110. For example, the user 102 may select an additional item, thereby providing an additional label 106 to the selection classifier 108. In response, the selection classifier 108 will reclassify automatically selected items based on the additional received labels 106. The user 102 may continue to select or deselect new items and thus provide additional labels 106 to the selection classifier 108. The selection classifier 108 continues to reclassify items based on the labels 106 received and updates the GUI 104 (e.g., selection window) with its item selection set 110.

In one example, the selection classifier may be configured to determine the item selection set based upon hard labels (e.g., explicit selections or deselections by the user) and/or soft labels (e.g. probabilistic labels generated by another algorithm). Hard labels are labels that may correspond to decisions of the user. For example, if a user selects or deselects a file, a hard label may be generated telling the system that the user wants to or does not want to select that file. Soft labels may be generated by a separate algorithm (e.g., a generalization model), which can predict labels based upon behavioral features determined from selection tasks performed by one or more users. The algorithm generating the soft labels can utilize knowledge of how people tend to do selection tasks in the form of typical patterns of behavior that specific populations, tasks, or individuals could have. For example, if the system automatically selects some items, and the user does not deselect any of the items but instead selects a new example, the algorithm may predict a soft label of positive value based upon prior observations of such behavior consistently implying that the user intended to keep the automatically selected items.

More particularly, the selection process may determine which items to automatically select by determining soft labels that are used in addition to hard-labels provided by the user to train a selection classifier. The selection classifier may be trained as a mixture of individual component learners collectively sufficient to determine a more complex item selection (e.g., to effectively express an appropriate degree of selection complexity) as to which items to select. In one example, the selection classifier may combine (e.g., via boosting or another component combination approach) one or more component learners (e.g., decision trees) into an overall selection classifier, which has better performance than the individual component learners (e.g., decision trees). The combination of component learners (e.g., via boosting) into an ensemble of component learners provides an overall selection classifier that changes the relatively weak selection power of the component learners (e.g., single decision trees) into a single combined classifier having a much stronger selection power than respective individual component learners.

In one example, the combined classifier may perform the selection process based on a combination of hard labels (e.g., explicit labels from the user) and soft labels that are determined by a separate label prediction algorithm (for instance, logistic regression, linear regression, etc.). This label prediction algorithm can be trained on different features of the user's behavior and use these behaviors to determine soft labels. The soft labels are then used in addition to hard-labels provided by the user to train a classifier (for example boosted decision trees) to determine which items should be automatically selected. For example, a decision tree may decide to select files which have a date newer than Apr. 30, 2009 (e.g., not select files which are older) and which were formed by user X. By basing a file selection decision on a mixture of results from a set of decision trees, the selection process can find files which meet a large number of diverse criteria, thereby allowing a system to generalize what types of files that a person is looking for on a more discrete level. In one example, limited depth (e.g., depth=2) decision trees may be used.

During operation the selection classifier may improve selection results by training the set of the component learners (e.g., modifying the set of decision trees). Training the set of component learners may comprise manipulation of the decision trees used to perform the selection process. For example, decision trees may be reordered, added, removed, etc., based upon a user selection and/or de-selection of items. For example, if a user picks an item (e.g., user chooses an item to be correct) the combination of existing decision trees can be compared against the decision of the user. If the combination is incorrect, then another decision tree can be added and the results of the added decision tree may be mixed with the results of the existing decision trees. This method allows for the existing decision tree to have an input with decreased weight while including in a new input from the behavior of the user in the form of the new decision tree. Therefore, through training, the more user data provided to the system, the more decision trees that can be used and the more accurate the choice of the generated selection.

Figure 2:
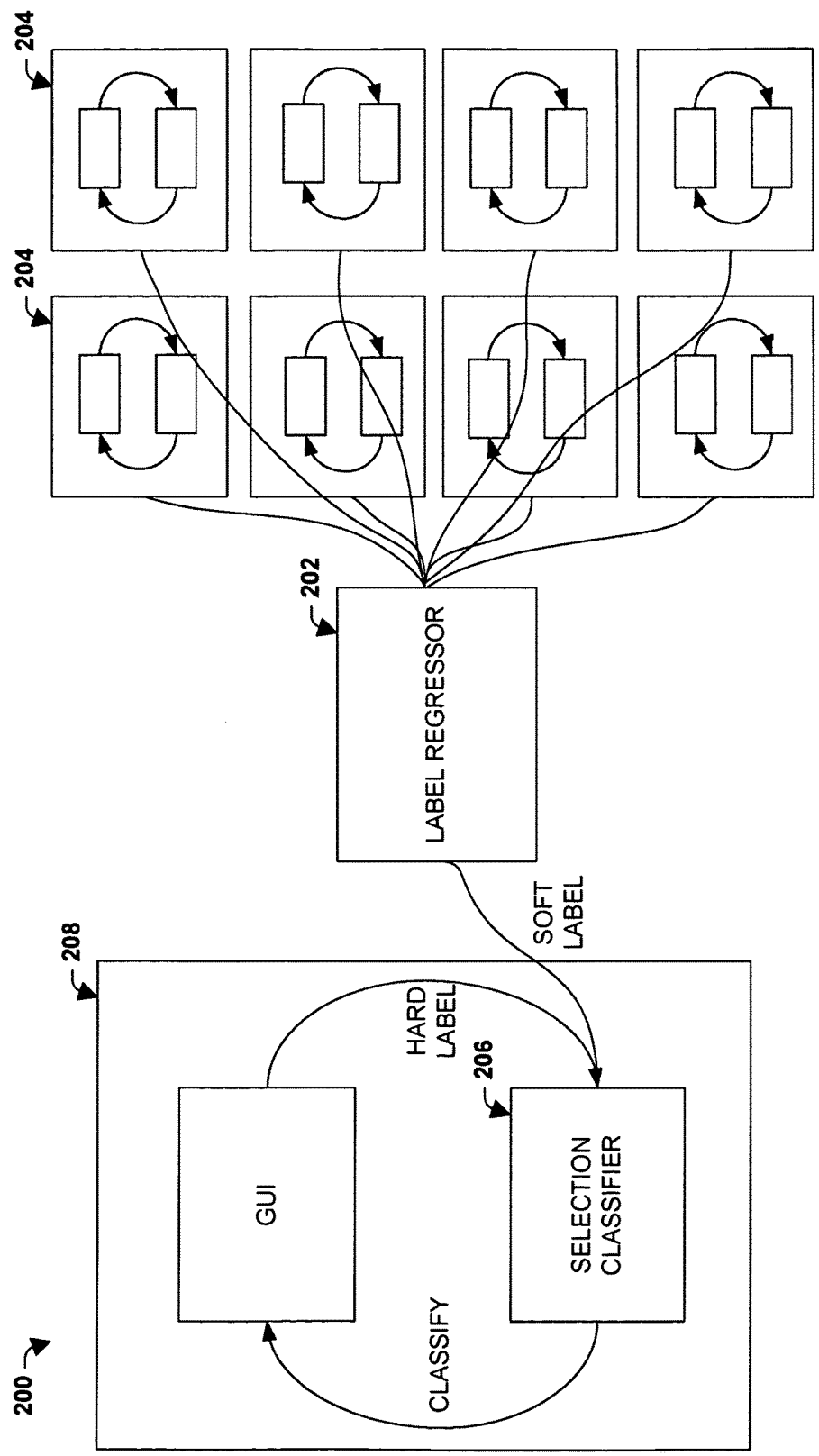
FIG. 2 illustrates an exemplary block diagram of a generalized selection system comprising a label regressor configured to receive data from a plurality of user selection sessions.

In one example, a soft label may be formed by a secondary mechanism, such as a label regressor. FIG. 2 illustrates an exemplary block diagram 200 of a generalized selection system comprising a label regressor 202 configured to receive data from a plurality of user selection sessions 204. The label regressor 202 is configured to form soft labels from a generalization model which "learns" from data on how users perform selection tasks taken over many user selection sessions 204. The label regressor 202 then provides these soft labels to the selection classifier 206 for a particular user selection session 208 (e.g., the label regressor provides input, using a generalization model resulting from training the label regressor, to the selection classifier).

The label regressor 202 may be trained to make soft labels, or probabilistic predictions about what items are likely to be selected, based on data received from previous user selection sessions 204 (e.g., comprising users' previous interactions with the selection classifier 206). In other words, the label regressor 202 may learn from previous user selection sessions 204 and then make predictions (e.g., soft labels) on a current session, based on features of the user's behavior that are provided to the selection classifier 206. The soft labels may be provided to the selection classifier 206 to be used in conjunction with the hard labels to improve the item selection list.

More particularly, in the example of FIG. 2, the label regressor 202 may be configured to use data from a plurality of different previous user selection sessions 204 of one or more users doing selection tasks, thereby allowing the label regressor 202 to provide the selection classifier with an input trained by a community of users. The use of data compiled from many different previous user selection sessions, to form a model of how to generalize selections, allows for a more robust selection process that is not limited by a small number of user selections (e.g., hard labels).

As shown in FIG. 2, the label regressor 202 receives data from many different previous user selection sessions 204. The label regressor 202 then makes a prediction of a user's desired selection based on features of the user's behavior which are implicitly collected during the process of providing hard-labels. The label regressor's prediction may then be transferred to the selection classifier, which is configured to combine the labels from the user with the predictions of the label regressor in order to come up with a high quality prediction of the user's desired selection.

In an alternative example, data may be preloaded into an item selection program (e.g., an email program, a file selection program, etc.) to aid in item selection. For example, training may be performed by a software provider and large amounts of training data may be saved in a system to aid in item selection (and this preloaded data may be supplemented with subsequent user activity).

Figure 3:
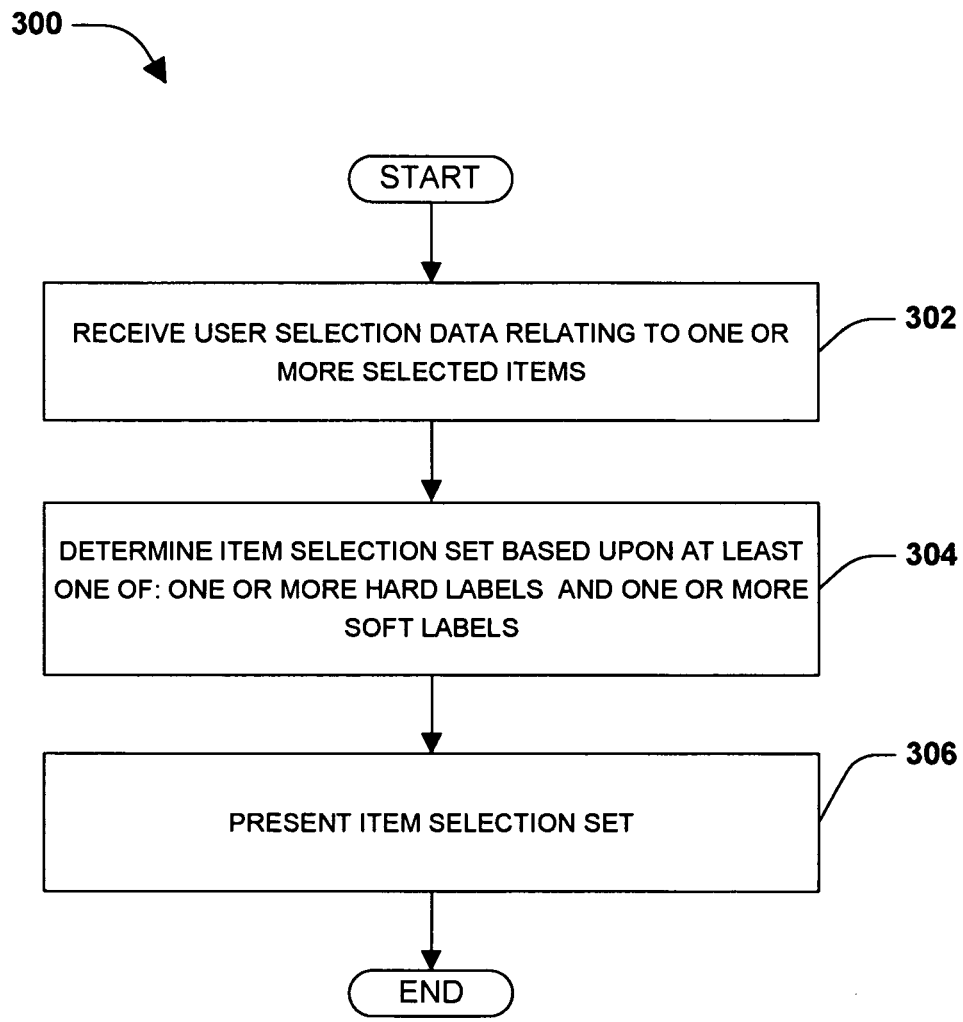
FIG. 3 illustrates a flow chart illustrating an exemplary method for receiving initial user selection data, forming an item selection based upon hard and soft labels, and presenting the item selection set to a user.

FIG. 3 illustrates an exemplary method 300 for presenting an item selection set to a user. More particularly, FIG. 3 illustrates a method for receiving initial user selection data, forming an item selection list based upon hard and soft labels, and presenting the item selection list to a user.

At 302 user selection data relating to one or more selected items is received. As stated above, the selection data may initially comprise positive (e.g., item selections) actions taken by the user.

An item selection set is determined at 304. The item selection set may be determined based upon at least one or more hard labels or one or more soft labels. The hard labels may be derived from the user selection data, while the soft labels may be derived based upon a generalization model (e.g., a logistical regression model) trained over a plurality of use selection sessions. The hard and soft labels are combined (e.g., using a scaling factor, a (alpha)) to train an overall selection classifier (e.g., a boosted set of decision trees, etc.) that then determines an item selection set.

At 306 the items selection set is presented to the user. The item selection may be presented to the user by automatically selecting items that the user may be interested in (e.g., automatically highlighting items in a GUI). Once selected, a user may make use of these selections as they would with items they had selected on their own, for example by deleting the items, moving the items, etc. This automatic selection of items aids users in selection of items, thereby allowing users to perform complex selection tasks with greater efficiency.

It will be appreciated that method 300 may be operated iteratively to provide enhanced results over multiple selections of a user. Iterative operation of method 300 repeats actions 302 through 306 for subsequent user selections. For example, subsequent positive (e.g., item selections) and/or negative (e.g., item de-selections) actions may be received as feedback selection data and used to determine an updated item selection set that is presented to a user. These subsequent user feedback selections may be used in conjunction with prior user selections to form a more accurate selection set that fits a users needs. Therefore iterative operation of method 300 provides for a highly effective method of automatic item selection.

Figure 4:
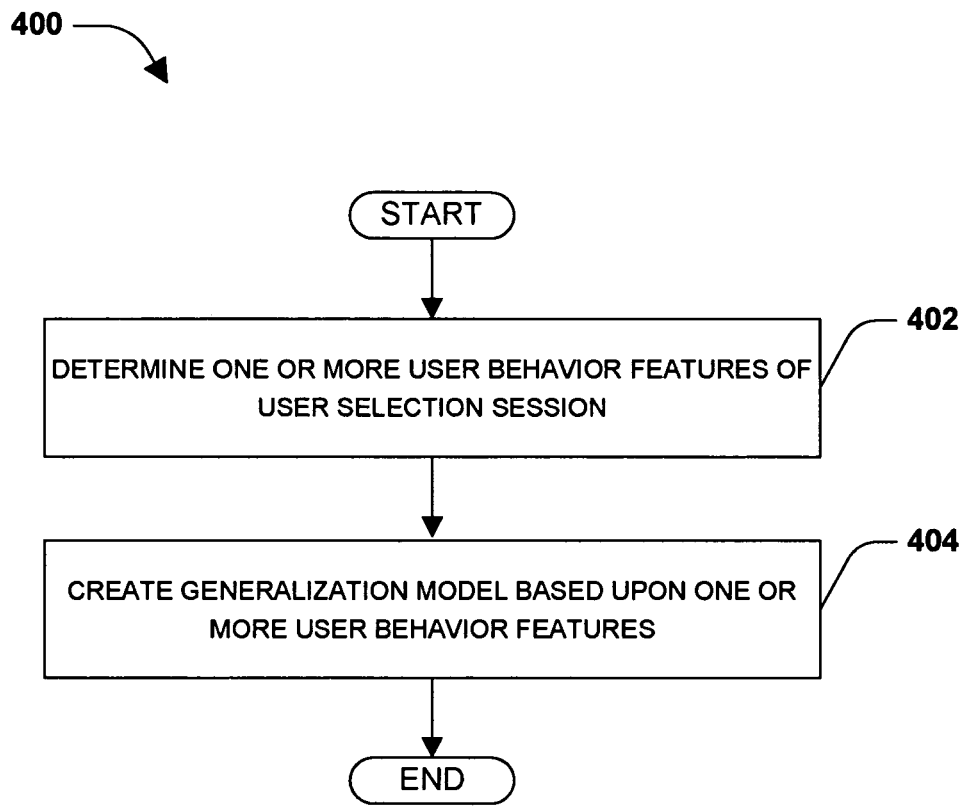
FIG. 4 illustrates a flow chart illustrating an exemplary method for generating the training data that may be used to train the label regressor.

FIG. 4 illustrates an exemplary method 400 for generating training data that may be used to train a label regressor, such as that previously described. More particularly, when a user applies an operation (e.g., delete, copy, etc.) to a file, this implies that the user is satisfied with the selection and as such the desired selection state is made explicit as hard labels. The resulting hard labels can be used, along with the behavior features from the session, to train the label regressor. The method relies upon the generation of a generalization model which allows a system to "learn" from user selection.

At 402 one or more user behavior features (e.g., behavior data) are determined. The user behavior features may comprise file selection features that are not context based. The system may determine behavior features based upon present and/or prior selection tasks made by one or more users. For example, if a user selects two non-adjacent items, a behavior feature may be determined for those items in between the user-selected items.

More particularly, in one example, the behavior features may include a user interface distance between a first user selection and a second user selection (e.g., the distance between the selection of one item in a browser and the selection of another item in the browser). In another example, the behavior features may include the event that an item is automatically selected, and no automatically selected items are subsequently de-selected by the user.

Furthermore, it will be appreciated that user behavior features may be determined from one or more users and/or one or more user selection sessions. For example, user behavior features, determined from a single user over many selection sessions (e.g., a first user engaged with a first selection session and a second selection session) and/or from many users over many selection sessions (e.g., a first user engaged with a first user selection session and a second user engaged with a second user selection session), may be utilized for generating the training data that may be used to train the label regressor.

A generalization model may be formed based upon one or more behavior features at 404. In one typical example, a single generalization model may be formed. In an alternative example, a plurality of generalization models are formed for multiple purposes or groups. For example, a generalization model may be formed for a group of people who perform a similar task, while a separate generalization model may be formed for another group that does other tasks.

The method 400 may be operated iteratively to generate the training data based on user selection sessions over a period of time. For example, training data may be generated to update the generalization model during the reception of additional behavior data (e.g., during subsequent user selection sessions).

Figure 5:
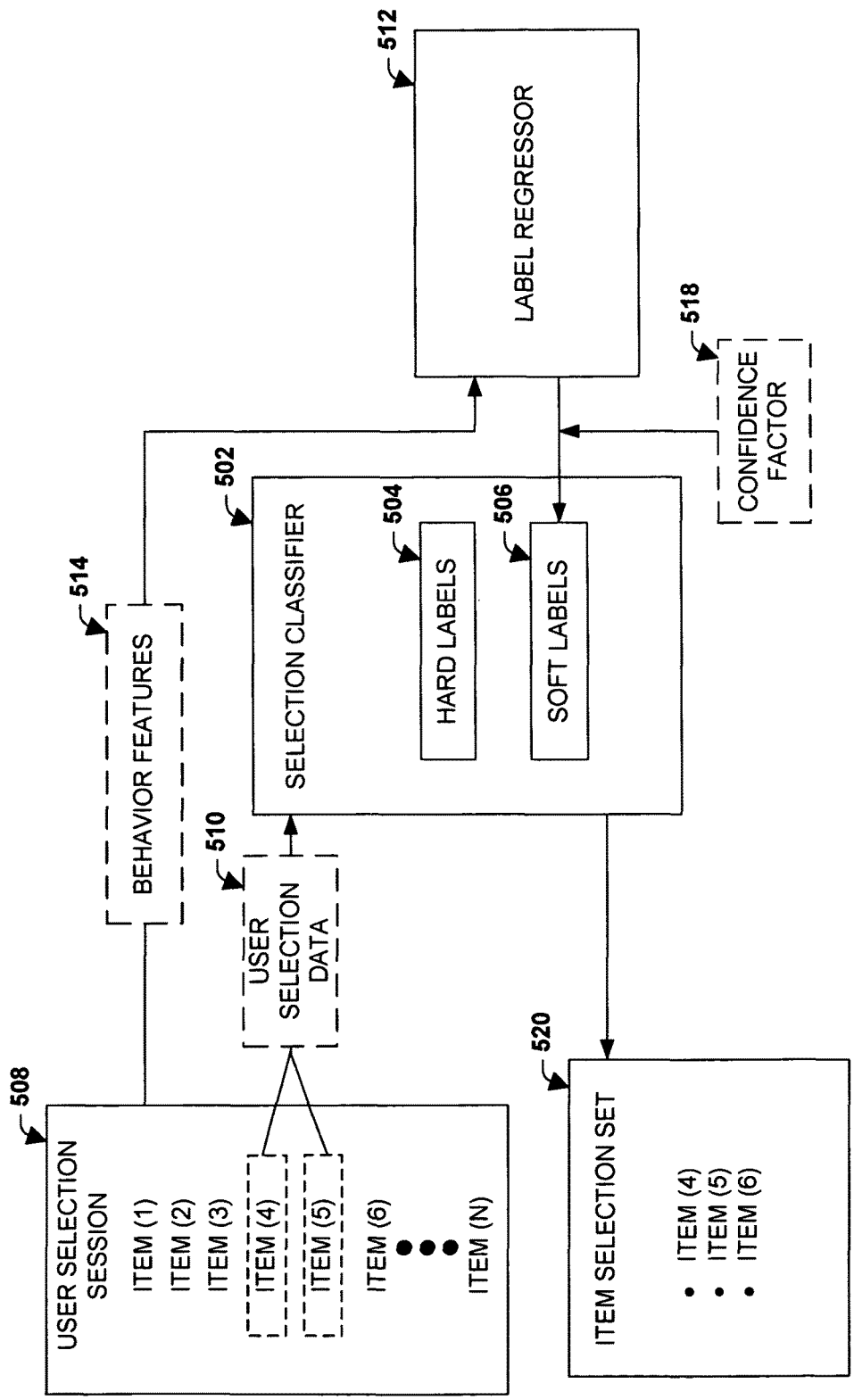
FIG. 5 illustrates an exemplary block diagram of a generalized selection system as provided herein receiving an initial user file selection and forming a file selection set.

FIG. 5 illustrates an exemplary block diagram 500 of a generalized selection system as provided herein receiving an initial user file selection and forming an item selection set. As illustrated in FIG. 5, a selection classifier 502 may be configured to receive both hard labels 504 and soft labels 506 which are used to determine an item selection set 520.

More particularly, a selection classifier 502 is coupled to a user selection session 508 (e.g., GUI). A user may select items comprised within the user selection session (e.g., item (4) and item (5)). Hard labels 504 are received by the selection classifier 502 as user selection data 510 collected from the user selection session 508. As illustrated in FIG. 5, the hard labels 504 comprise selection data from an initial user selection.

A label regressor 512 may also be coupled to the user selection session 508 and can be configured to receive user behavior features 514 (e.g., using a generalization model generator comprised within the label regressor) from the user selection session 508 and/or from prior selection tasks performed by one or more users. For example, a behavioral feature may be determined by a user clicking on item (4) and item (5), next to one another and whether the user clicks on item (6) next to them. Behavioral features may be used to form and/or train a generalization model (e.g., stored in a data structure), for example. The generalization model allows the label regressor 512 to rely upon prior actions to determine what a user is trying to do. This allows a system to "learn" the selection behavior of users, in the form of a generalization model, over the course of multiple sessions and/or multiple users.

The behavior features 514 received by the label regressor 512 are used (e.g., by a soft label generator comprised within the label regressor), in conjunction with the generalization model, to predict soft labels 506, which are continuous numbers, and can be probabilistic in nature, about what items are likely to be selected (e.g., an item selection probability). In one particular example, a scale factor 518 (e.g., a confidence weight given to the soft labels) may be generated by the label regressor 512 and may be applied to soft labels 506 received from the label regressor 512. The scale factor 518, $\alpha$, is used to combine the hard-labels provided to the user with the soft-labels generated by the label regressor 512. More particularly, the scale factor determines how the numerical values of the predicted (soft) labels should be scaled relative to the explicit (hard) labels.

In one particular example, the scale factor, a, may be enhanced (e.g., optimized) for performance over many sessions from one or more users. In such an example, the possible values of $\alpha$ are iterated over and evaluated for their performance against a training set. The value of $\alpha$ having the highest performance is then chosen, in one example. In an alternative example, $\alpha$ may be chosen by a user.

The soft labels 506 determined by the label regressor 512 are provided, in addition to the user's explicit hard labels, into the selection classifier 502 to improve automatic selection performance. Based upon the received hard labels 504 and soft labels 506, the selection classifier 502 provides an item selection set 520 comprising an automatically selected item (e.g., item (6)) in addition to the user's initially selected items (e.g., item (4) and item (5)).

Figure 6:
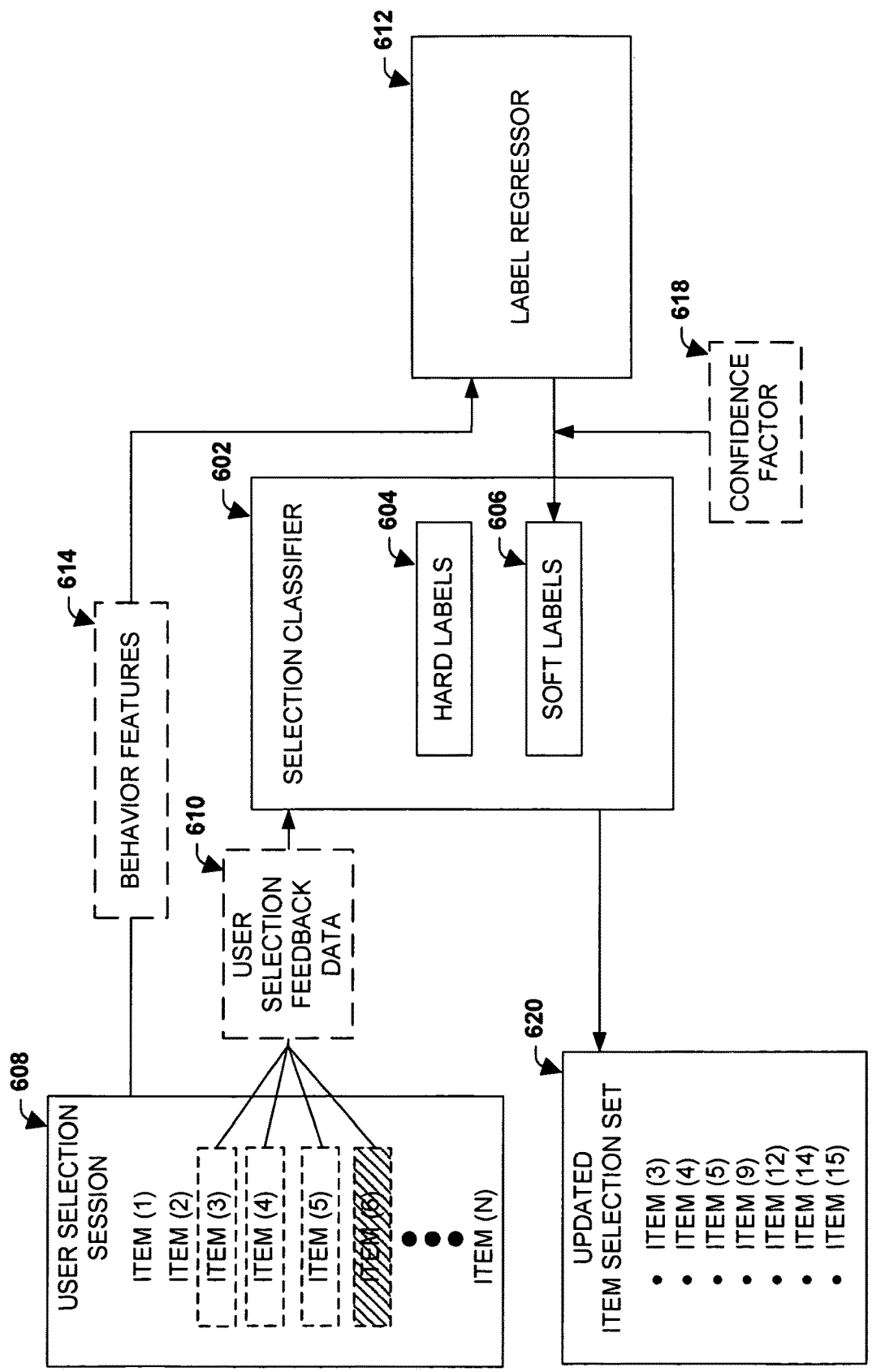
FIG. 6 illustrates an exemplary block diagram of a generalized selection system as provided herein receiving subsequent user file selections and/or de-selections and forming an updated file selection set.

FIG. 6 illustrates an exemplary block diagram of a generalized selection system as provided herein configured to receive subsequent selections and/or de-selections and present an updated item list. As illustrated in FIG. 6, the user selection session 608 comprises the generated file selections from user selection session 508 in FIG. 5 (e.g., item (4), item (5), and item (6) are selected). In addition, the user selection session 608 comprises updated actions comprising an additional item, item (3), selected by the user, and an item, item (6), de-selected by the user. The user's updates of the user selection session 608 provide user selection feedback data 610 to the selection classifier 602 in the form of one or more updated hard labels 604. The user's updates of the user selection session 608 may also generate features leading to one or more updated soft labels 606 being provided by the label regressor 612 (e.g., by providing additional behavior features 614 to the label regressor 612) which uses a generalization model to form soft labels. As above (e.g., in FIG. 5), a scale factor 618 may be applied to the soft labels. The selection classifier 602 updates the item selection set 620 based upon the updated user selection feedback data 610 and/or behavioral features 614. As illustrated in FIG. 6, the updated item selection set 620 comprises the previously selected items (e.g., item (3), item (4), and item (5)) in addition to newly selected items (e.g., item (9), item (12), item (14), and item (15)) based upon the reconfigured updates due to the user's feedback.

It will be appreciated that subsequent updates may be made to the item selection set utilizing a system similar to that of FIG. 6, wherein user selection drive the selection classifier to form an updated item selection set that is returned to the user's GUI. After respective additional item selections or de-selections are provided, the system may retrain the selection classifier and updates its predictions on the items which have not been explicitly selected or deselected, updating their state as appropriate. In one particular example, the training may be limited to a cutoff number of boosting iterations that are equal to an integer number (e.g., 10).

Figure 7:
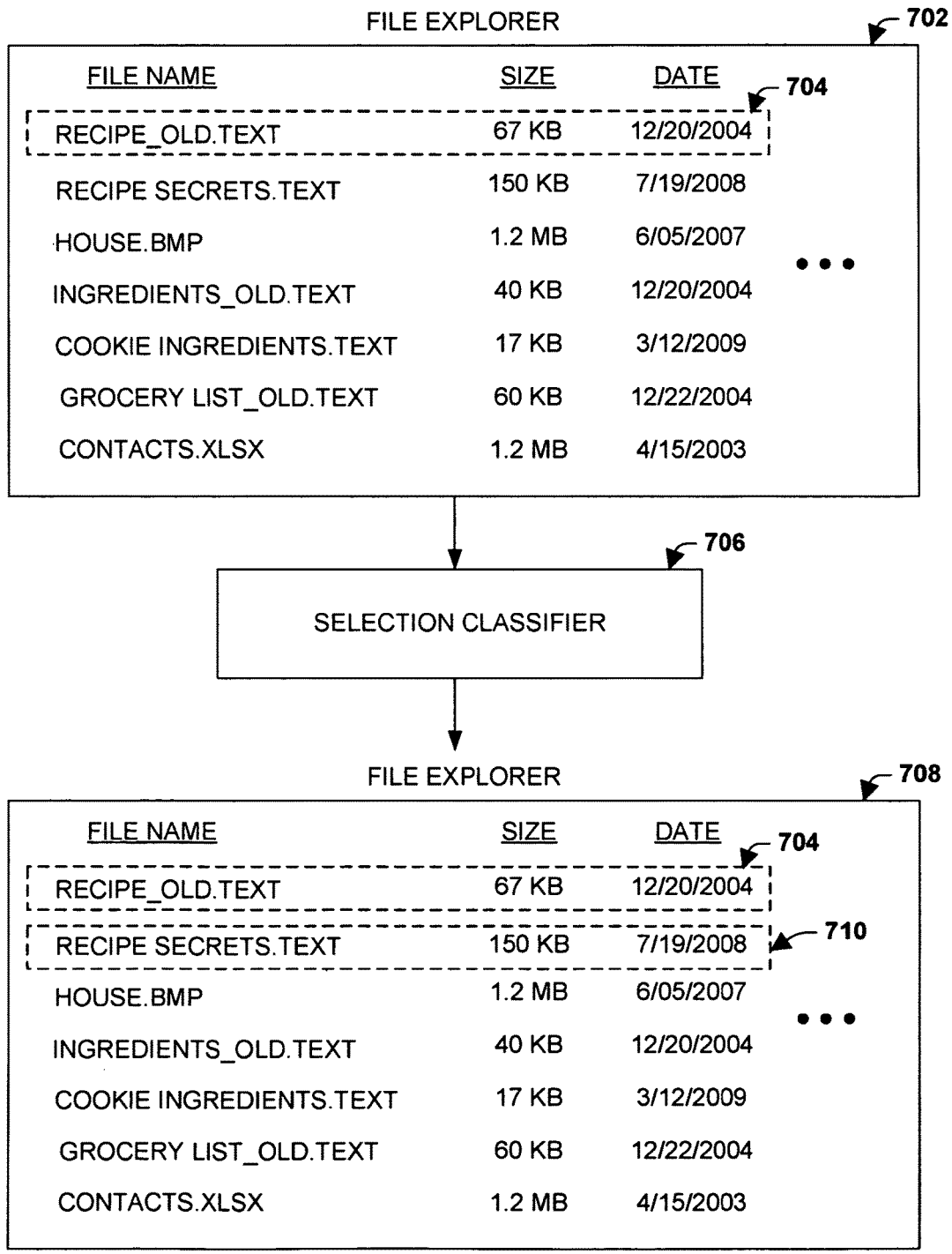
FIG. 7 illustrates a workflow diagram of the automatic generalization selection receiving an initial user file selection and forming a file selection set.
Figure 8:
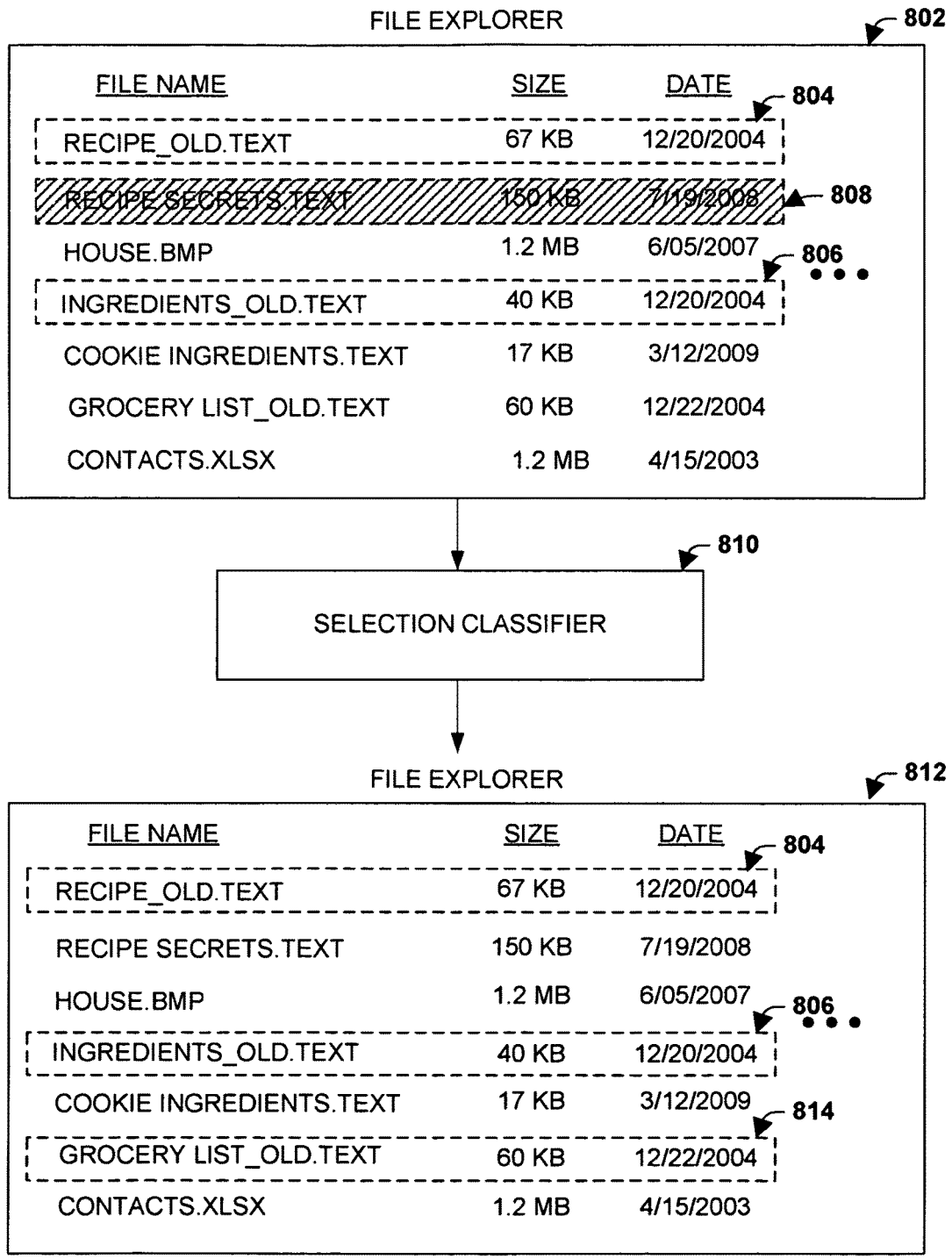
FIG. 8 illustrates a workflow diagram of the automatic generalization selection receiving subsequent user file selections and/or de-selections and forming an updated file selection set.

FIGS. 7-8 illustrate exemplary workflow diagrams 700 of the selection process as provided herein for a GUI interface displaying files (e.g., media files, data files, etc.). In particular, FIGS. 7-8 illustrate the files that are selected in a file management program displayed in a GUI interface before and after the automated selection of a selection classifier.

More particularly, FIG. 7 illustrates a workflow diagram 700 of the automatic generalization selection receiving an initial user file selection and forming a file selection set. For example, in FIG. 7 illustrates a GUI interface 702 containing seven files. The GUI interface may provide most of the features familiar to standard browser windows (e.g., sorting by column, block selection, multiple selection, etc.). In one particular example, the automatic selection method provided herein may be toggled on and off by a user via a key selection (e.g., alt-click vs. control-click). This feature would allow user to turn the method on for only for complex selection tasks, thereby avoiding any inconvenience that may be caused by incorrect selections sets during simple selection tasks.

As illustrated in FIG. 7, a user makes an initial selection of a first file, 704, named RECIPE_OLD.TEXT. Upon the user's initial selection, a label will be relayed to the selection classifier 706. The selection classifier 706 will determine an item selection set comprising other files that the user may want to select. The item selection set is returned to the user's GUI interface 708 and the file management program automatically selects a second file, 710, named RECIPE SECRETS.TEXT. In the example of FIG. 7, based upon the user's initial selection of file 704, the selection classifier 706 has decided to automatically select other files having the word "recipe" in the file name.

In an alternative example, the file selection classifier 706 may provide an item selection set when a user has selected at least two items (e.g., files). The use of at least two user selections provides more data to the selection classifier 706, thereby avoiding spurious generalizations based on a single selection.

FIG. 8 illustrates a workflow diagram 800 of an automatic generalization selection receiving subsequent user file selections and/or de-sections (e.g., of incorrectly generated file selections) and forming an updated file selection set. For example, in FIG. 8, GUI 802 contains the generated file selections from GUI interface 708 from FIG. 7 (e.g., file 804, named RECIPE_OLD.TEXT, and file 808, named RECIPE SECRETS.TEXT, are selected). The user updates the generated file selection in GUI 802 by deselecting file 808 ("RECIPE SECRETS. TEXT") (e.g., comprising an incorrectly generated automatic file selection) and instead selects the file 806 ("INGREDIENTS_OLD.TEXT"). The updated feedback selection may be relayed to the selection classifier 810 which determines an updated selection set. The updated selection set is returned to the user's GUI interface 812 and the system automatically selects file 814, named GROCERY LIST_OLD.TEXT. In the example of FIG. 8, based upon the user's feedback selection comprising the de-selection of file 808 and the selection of file 806, the selection classifier 810 has updated the selection set from automatically selecting files that had the word "recipe" in the name (as in FIG. 7) to automatically select files having the word "old" in the name.

Figure 9:
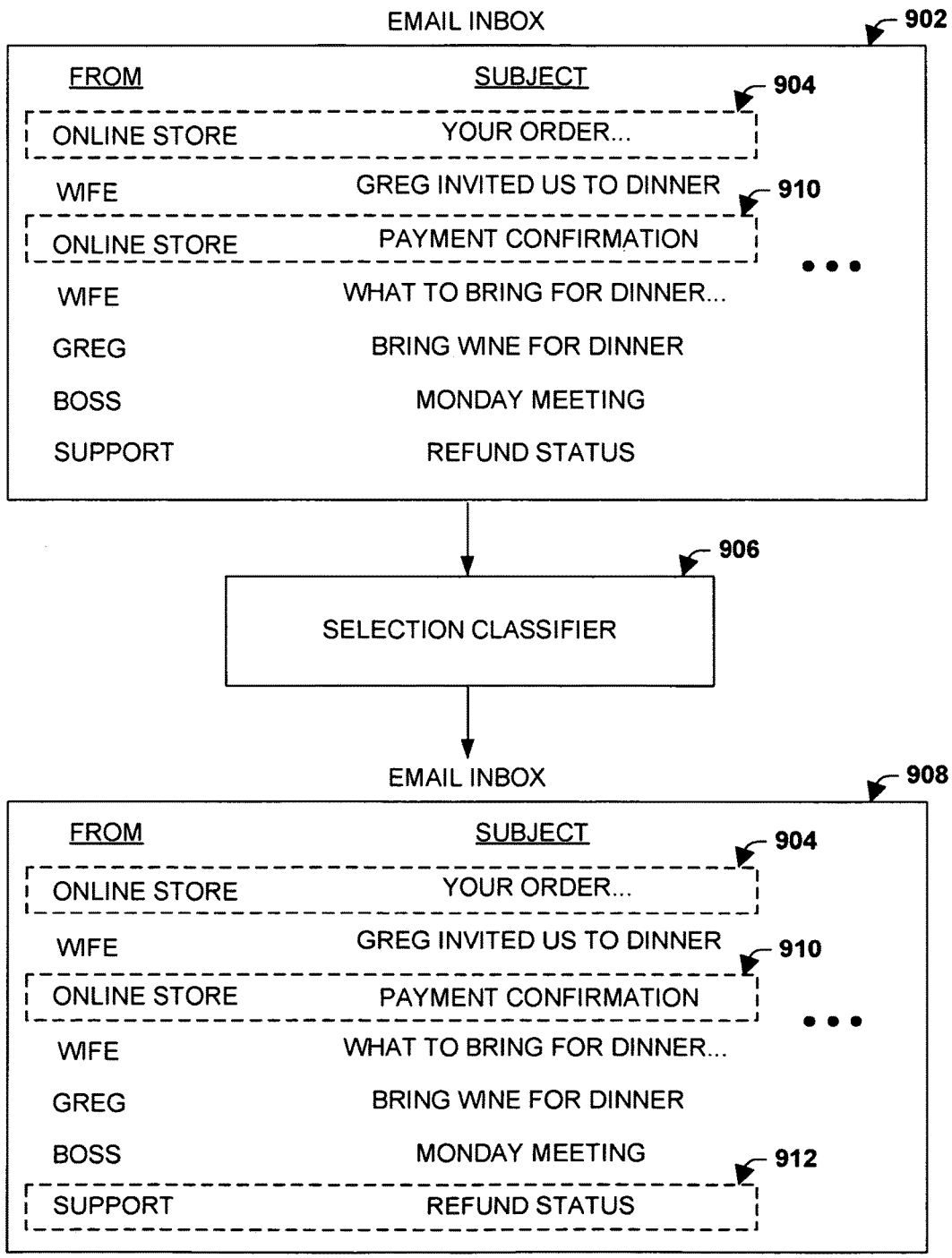
FIG. 9 illustrates a workflow diagram of the automatic generalization selection receiving initial user email selections and forming an updated email selection set.

FIG. 9 illustrates a workflow diagram of the automatic generalization selection receiving initial user email selections and forming an updated email selection set. More particularly, FIG. 9 illustrates emails that are selected in an email inbox displayed in a GUI interface 902 before and after the automated selection of the selection classifier. As illustrated in FIG. 9, emails may be automatically selected in the same manner as files. For example, as shown in FIG. 9 the user selects emails 904 and 910. The selection data is returned to the selection classifier 906 as labels which will be used to determine a selection set comprising other emails that the user may want to select. The selection set is returned to an email browser in the user's GUI interface 908 and the system automatically selects another email, 912, wherein the automatically selected email 912 relates to a particular business transaction. Analogous to the file selection illustrated in FIG. 8, the email selection set may also be subsequently updated by receiving subsequent user file selections and/or de-selections and forming an updated file selection set.

Figure 10:
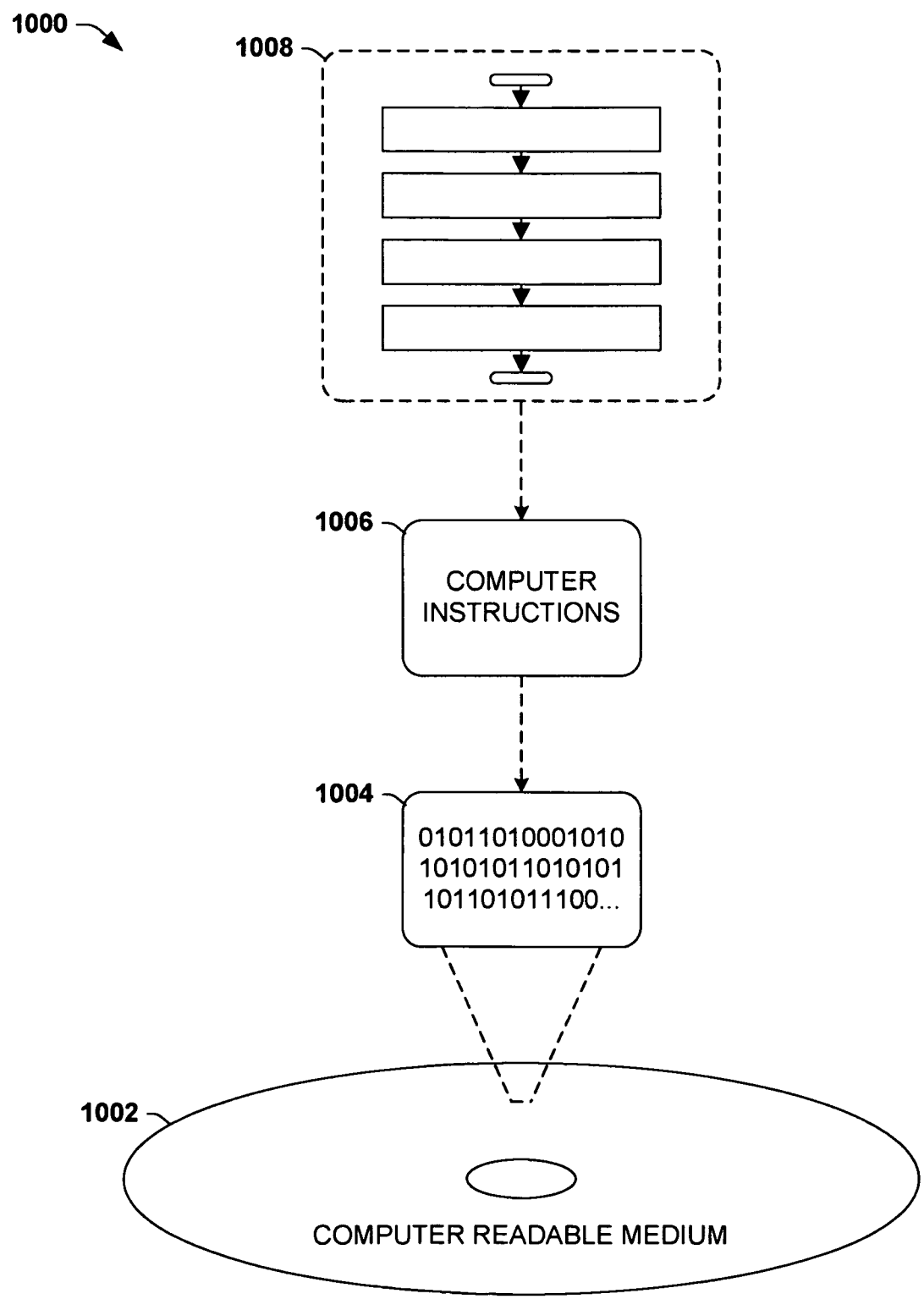
FIG. 10 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 10, wherein the implementation 1000 comprises a computer-readable medium 1016 (e.g., a CD-R, DVD-R, or a platter of a hard disk drive), on which is encoded computer-readable data 1010. This computer-readable data 1010 in turn comprises a set of computer instructions 1012 configured to operate according to one or more of the principles set forth herein. In one such embodiment 1000, the processor-executable instructions 1014 may be configured to perform a method, such as the exemplary method 300 of FIG. 3, for example. In another such embodiment, the processor-executable instructions 1014 may be configured to implement a system, such as the exemplary system 500 of FIG. 5, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 11:
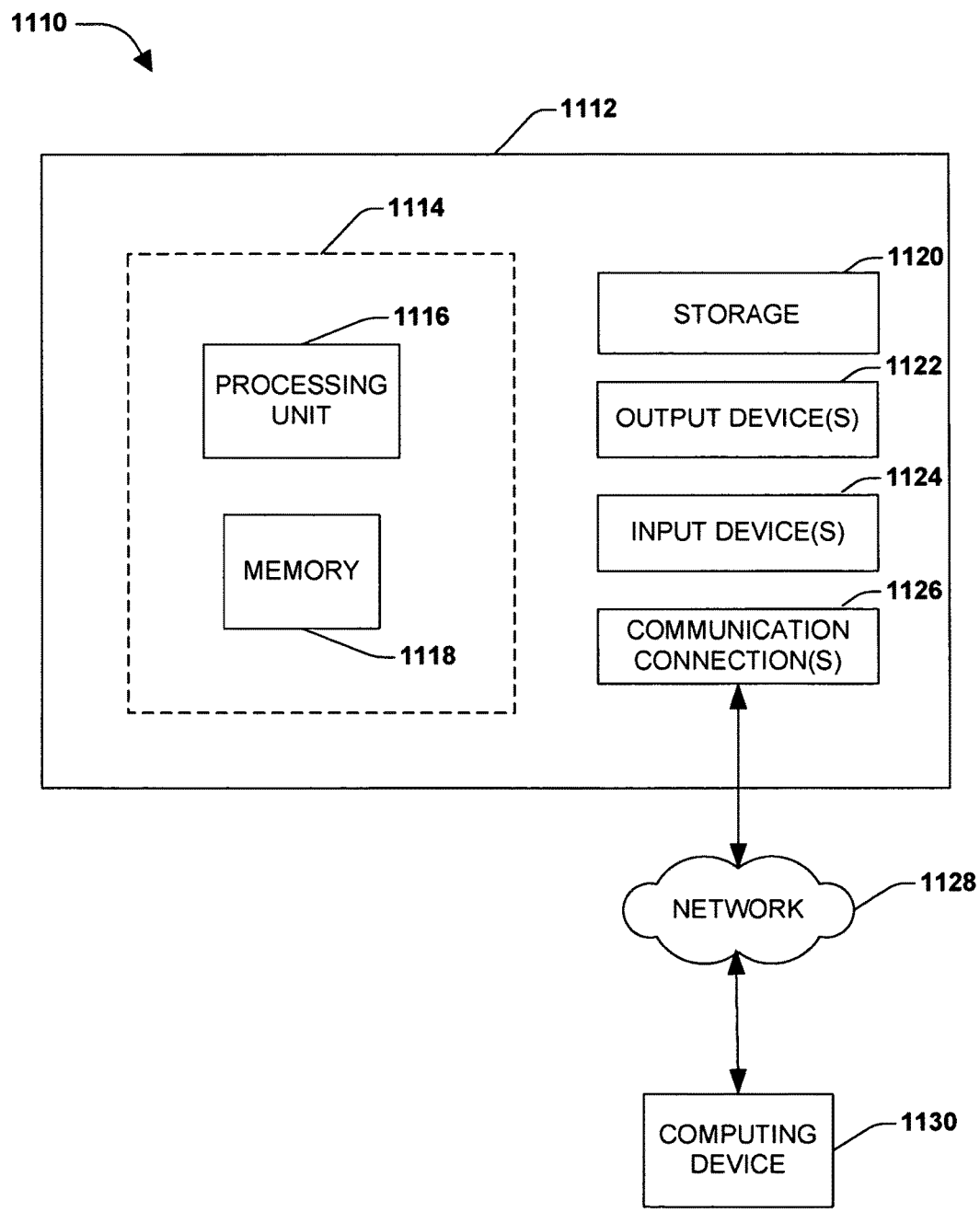
FIG. 11 illustrates an exemplary computing environment wherein one or more of the provisions set forth herein may be implemented.

FIG. 11 and the following discussion provide a brief, general description of a suitable computing environment to implement embodiments of one or more of the provisions set forth herein. The operating environment of FIG. 11 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 11 illustrates an example of a system 1110 comprising a computing device 1112 configured to implement one or more embodiments provided herein. In one configuration, computing device 1112 includes at least one processing unit 1116 and memory 1118. Depending on the exact configuration and type of computing device, memory 1118 may be volatile (such as RAM, for example), non-volatile (such as ROM, flash memory, etc., for example) or some combination of the two. This configuration is illustrated in FIG. 11 by dashed line 1114.

In other embodiments, device 1112 may include additional features and/or functionality. For example, device 1112 may also include additional storage (e.g., removable and/or non-removable) including, but not limited to, magnetic storage, optical storage, and the like. Such additional storage is illustrated in FIG. 11 by storage 1120. In one embodiment, computer readable instructions to implement one or more embodiments provided herein may be in storage 1120. Storage 1120 may also store other computer readable instructions to implement an operating system, an application program, and the like. Computer readable instructions may be loaded in memory 1118 for execution by processing unit 1116, for example.

The term "computer readable media" as used herein includes computer storage media. Computer storage media includes volatile and nonvolatile, removable and non-removable media implemented in any method or technology for storage of information such as computer readable instructions or other data. Memory 1118 and storage 1120 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1112. Any such computer storage media may be part of device 1112.

Device 1112 may also include communication connection(s) 1126 that allows device 1112 to communicate with other devices. Communication connection(s) 1126 may include, but is not limited to, a modem, a Network Interface Card (NIC), an integrated network interface, a radio frequency transmitter/receiver, an infrared port, a USB connection, or other interfaces for connecting computing device 1112 to other computing devices. Communication connection(s) 1126 may include a wired connection or a wireless connection. Communication connection(s) 1126 may transmit and/or receive communication media.

The term "computer readable media" may include communication media. Communication media typically embodies computer readable instructions or other data in a "modulated data signal" such as a carrier wave or other transport component and includes any information delivery media. The term "modulated data signal" may include a signal that has one or more of its characteristics set or changed in such a manner as to encode information in the signal.

Device 1112 may include input device(s) 1124 such as keyboard, mouse, pen, voice input device, touch input device, infrared cameras, video input devices, and/or any other input device. Output device(s) 1122 such as one or more displays, speakers, printers, and/or any other output device may also be included in device 1112. Input device(s) 1124 and output device(s) 1122 may be connected to device 1112 via a wired connection, wireless connection, or any combination thereof. In one embodiment, an input device or an output device from another computing device may be used as input device(s) 1124 or output device(s) 1122 for computing device 1112.

Components of computing device 1112 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1112 may be interconnected by a network. For example, memory 1118 may be comprised of multiple physical memory units located in different physical locations interconnected by a network.

Those skilled in the art will realize that storage devices utilized to store computer readable instructions may be distributed across a network. For example, a computing device 1130 accessible via network 1128 may store computer readable instructions to implement one or more embodiments provided herein. Computing device 1112 may access computing device 1130 and download a part or all of the computer readable instructions for execution. Alternatively, computing device 1112 may download pieces of the computer readable instructions, as needed, or some instructions may be executed at computing device 1112 and some at computing device 1130.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description.

Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such features may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method, comprising:
receiving a selection, by a user, of a first item in a list of items;
receiving, while the first item is selected, a second selection of an item on the list, by the user;
automatically selecting a third item from the list using a selection classifier that uses the user's selections of the first and second items, previous user selections of items from the list and predicted user selections of items from the list,
wherein the predicted user selections of items from the list are determined by a generalization model that is trained by using patterns of behavior of a plurality of user selection sessions and at least one behavior feature comprising a determination that training items are positioned within a user interface distance between two training items selected by any user on a user interface during the plurality of user selection sessions, and
wherein a scaling factor is used to scale the previous user selections of items on the list and the predicted user selections of items on the list in automatically selecting the third item; and
displaying the first selected item, the second selected item and the third selected item.

2. The method of claim 1, wherein the items selected by the user are assigned hard labels and the items predicted by the generalization model are assigned soft labels.

3. The method of claim 2, further comprising:
updating the hard labels and the soft labels based on user selection and deselection of items on the list and using the updated hard labels and the updated soft labels to update the generalization model.

4. The method of claim 1, wherein the generalization model that is trained using the plurality of selection sessions comprises a selection session associated with at least one of:
one or more selections by a second user, or
one or more de-selections by the second user.

5. The method of claim 1, comprising:
receiving a de-selection of the third item; and
updating the generalization model based upon the de-selection-of the third item.

6. The method of claim 1, comprising:
determining that the automatic selection method is turned on by the user based upon a first key selection of a first key during the selection of the first item and the second selection of the second item.

7. The method of claim 1, at least one of:
the first item of a different type than the second item,
the first item of a different type than the third item or
the second item of a different type than the third item.

8. A system, comprising:
one or more processing units; and
memory comprising instructions that when executed by at least some of the one or more processing units, perform operations comprising:
receiving a selection, by a user, of a first item in a list of items;
receiving, while the first item is selected, a second selection, by the user, of a second item in the list;
responsive to determining that an automatic selection method is on, automatically selecting, while the first item and the second item are selected, a third item in the list using a selection classifier that uses the user selections of the first and second items, previous user selections from the list and predicted user selections from the list, wherein the predicted user selections are based upon the output of a generalization model trained using user behavior features comprising the determination that least one training item is positioned within a user interface distance between pairs of training items selected by any user during a plurality of selection sessions, such that the first item, the second item and the third item are concurrently selected; and
responsive to determining that the automatic selection method is not on, not automatically selecting the third item in the list; and
outputting the selected items.

9. The system of claim 8, wherein the automatically selecting is based upon a plurality of results from a plurality of decision trees.

10. The system of claim 8, wherein the behavior features are based on multiple training items' positions being between user selections of two non-adjacent training items in the user interface.

11. The system of claim 8, wherein the behavior features are based on a training item being automatically selected and not deselected by the user.

12. The system of claim 8, the operations comprising:
receiving a selection of a fourth item by the user after the third item is automatically selected; and
updating the generalization model based upon a determination that a de-selection of the third item was not received from the user prior to the selection of the fourth item.

13. The system of claim 8, wherein at least one of:
the first item is of a different type than the second item,
the first item is of a different type than the third item or
the second item is of a different type than the third item.

14. A system, comprising:
one or more processing units; and
memory comprising instructions that when executed by at least some of the one or more processing units, perform operations comprising:
receiving a selection of a first item comprised in a list of items;
receiving, while the first item is selected, a second selection of a second item comprised in the list; and
automatically selecting, while the first item and the second item are selected, a third item using a selection classifier that uses the selections of the first and second items and predicted user selections from the list, wherein the predicted user selections are based upon a generalization model trained with user behavior data comprising the determination that training items are positioned within a user interface distance between pairs of training items selected by a plurality of users over a plurality of selection sessions.

15. The system of claim 14, wherein the first item comprises a first database table entry item, the second item comprises a second database table entry item and the third item comprises a third database table entry item.

16. The system of claim 14, wherein at least one of the selection of the first item or the second selection of the second item are performed by a user.

17. The system of claim 14, wherein the plurality of selection sessions comprise a selection session associated with at least one of:
one or more selections by a user, or
one or more de-selections by the user.

18. The system of claim 14, the operations further comprising:
receiving a de-selection of the third item; and
updating the generalization model based upon the de-selection of the third item.

19. The system of claim 18, the operations further comprising:
receiving a selection of a fourth item after the third item is automatically selected; and
updating the generalization model based upon a determination that a de-selection of the third item was not received prior to the selection of the fourth item.

* * * * *

UNITED STATES PATENT AND TRADEMARK OFFICE
CERTIFICATE OF CORRECTION

PATENT NO. : 10,108,934 B2
APPLICATION NO. : 12/474025
DATED : October 23, 2018
INVENTOR(S) : Sumit Basu et al.

Page 1 of 1

It is certified that error appears in the above-identified patent and that said Letters Patent is hereby corrected as shown below:

On the Title Page

Item (54) Column 1, Line 1, delete "Items" and insert --Item--

Signed and Sealed this
Fourth Day of December, 2018

Andrei Iancu
*Director of the United States Patent and Trademark Office*